L. S. HAYDEN.
TOOL FOR BORING AND COUNTERBORING WOOD.
APPLICATION FILED APR. 23, 1921.

1,398,779. Patented Nov. 29, 1921.

INVENTOR
Louis S. Hayden
BY
Harry P. Williams
ATTORNEY

UNITED STATES PATENT OFFICE.

LOUIS S. HAYDEN, OF ESSEX, CONNECTICUT, ASSIGNOR TO THE CONNECTICUT VALLEY MANUFACTURING COMPANY, OF CENTERBROOK, CONNECTICUT, A CORPORATION OF CONNECTICUT.

TOOL FOR BORING AND COUNTERBORING WOOD.

1,398,779.     Specification of Letters Patent.    Patented Nov. 29, 1921.

Application filed April 23, 1921. Serial No. 463,928.

*To all whom it may concern:*

Be it known that I, LOUIS S. HAYDEN, a citizen of the United States, residing at Essex, in the county of Middlesex and State of Connecticut, have invented a new and useful Improvement in Tools for Boring and Counterboring Woods, of which the following is a specification.

This invention relates to those wood working tools which are provided for drilling holes for the shanks and counterboring such holes for the heads of nails and screws which it is desired to sink below the surface and cover with plugs or bungs.

The object of the invention is to produce a simple and cheap tool of this class with a stop which may be readily adjusted to limit the counter boring to any desired depth and which is so shaped that it will not obstruct the outward passage of the chips or shavings which result from the drilling and boring.

In attaining this end a drill for the shank hole is inserted in the end of a bit for the head counter bore and a stop with a spiral channel of approximately the same pitch as the spiral clearance groove of the bit is adjustably secured on the bit in such manner that in all positions the bit groove and stop channel register, thus permitting the free outward passage of the material removed by the boring operation.

Figure 1:
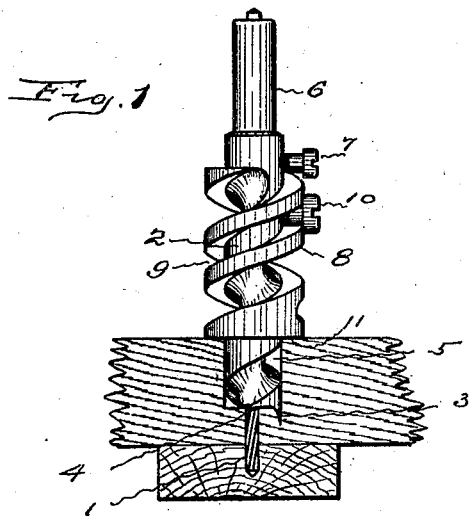
Figure 2:
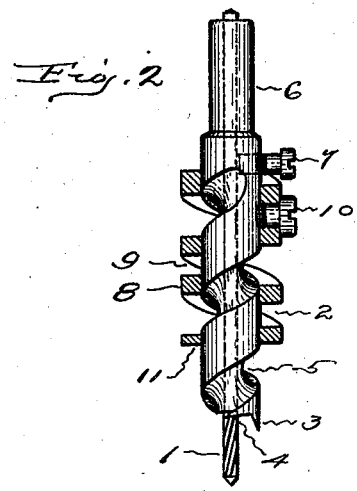
Figure 3:
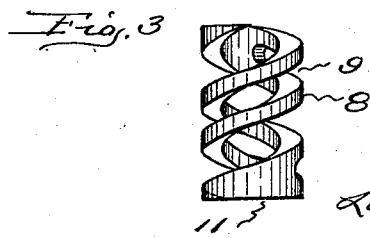

In the accompanying drawings Figure 1 illustrates the tool as in use. Fig. 2 shows a side view of the drill and bit with the stop cut in central section. Fig. 3 shows a side view of the worm-like stop.

The drill 1 for boring the small hole or hole for the shank of the nail or screw is a common form of wood boring twist drill. The bit 2 is of ordinary type with guiding lip 3, cutting lip 4, spiral clearance groove 5 and shank 6. Extending longitudinally through the center of the bit is a hole into which the drill is inserted and a screw 7 is threaded through the bit for clamping the drill with the necessary amount projecting to bore a hole of the desired depth below the counter bore hole which the bit produces.

The stop 8 is made in the form of a worm or sleeve with an open spiral channel from end to end having a pitch approximately the same as that of the groove in the bit, said stop having a bore that fits the bit. In the side of the stop is a spiral slot 9, the walls of which are approximately parallel with the spiral edges of the worm. Extending through this slot and turning into the bit is a screw 10 which serves as a guide for the stop when it is adjusted and for clamping the stop after it has been adjusted to the desired position for limiting the depth of the hole threaded and counterbored.

When the screw 7 is loosened the drill may be set to bore a hole of the required depth for the nail or screw shank. With the screw 10 loosened the stop may be turned spirally as it is guided by the side walls of the slot and adjusted until its gage end 11 is the required distance above the end of the bit to stop the bit from counter boring when the counter bore hole is of the necessary depth. The screw 10 is so located and the walls of the slot in the stop are so formed that the spiral edges of the channel in the stop will register with the spiral walls of the clearance groove in the bit in all positions to which the stop is adjusted. By reason of this, the stop does not obstruct the outward passage of the material removed by the action of the tool. This also permits of a very fine adjustment of the stop on the bit.

The invention claimed is:

1. A wood working tool comprising a boring bit, a drill projecting axially from the bit, a stop movably fitted on the bit, said stop having a spiral channel of approximately the same pitch as the clearance groove of the bit, also a spiral slot of approximately the same pitch as said channel, and means extending through said slot in the stop into the bit for guiding the stop when it is adjusted and clamping the stop in the position to which it is adjusted.

2. A wood working tool comprising a boring bit having a spiral clearance groove, a twisted drill projected axially from the bit, a stop adjustable on the bit, said stop having a spiral slot in its wall, and a guiding and clamping screw extending through said slot in the stop into the bit whereby when said screw is loosened the stop may be rotated and adjusted longitudinally and when the screw is tightened the stop is clamped in the position to which it is adjusted with relation to the cutting ends of the bit and drill.

3. A wood working tool comprising a boring bit and a drill projecting axially from the bit, a stop sleeve having a spiral open channel in its wall from end to end and adjustably fitted on the bit, and means for clamping the stop on the bit, said clamping means when loosened permitting the stop to be adjusted spirally on the bit.

4. A wood working tool comprising a boring bit, a drill of smaller diameter projecting axially from the bit, a worm having a spiral slot, adjustably mounted on the bit, and a screw extending through said slot in the worm into the bit for guiding the worm when it is adjusted and for clamping the worm in the position to which it is adjusted.

5. A stop for limiting the depth of cut of a boring bit comprising a sleeve adapted to fit the bit, said sleeve having an open spiral channel from end to end adapted to register with the clearance groove of the bit, and a spiral slot for the passage of a guiding and clamping screw.

LOUIS S. HAYDEN.